United States Patent
Yoo et al.

(10) Patent No.: US 10,164,562 B2
(45) Date of Patent: Dec. 25, 2018

(54) METHOD AND SYSTEM FOR PULSE WIDTH MODULATION

(71) Applicant: GM GLOBAL TECHNOLOGY OPERATIONS LLC, Detroit, MI (US)

(72) Inventors: Anno Yoo, Rochester Hills, MI (US); Sung-Yoon Jung, Irvine, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/485,293

(22) Filed: Apr. 12, 2017

(65) Prior Publication Data

US 2018/0302018 A1    Oct. 18, 2018

(51) Int. Cl.
*H02P 23/00* (2016.01)
*H02P 27/08* (2006.01)
*H02M 7/5387* (2007.01)

(52) U.S. Cl.
CPC ......... *H02P 27/08* (2013.01); *H02M 7/53875* (2013.01)

(58) Field of Classification Search
CPC ............................ H02M 7/53875; H02P 27/08
USPC ................................. 318/474, 811; 363/132
See application file for complete search history.

(56) References Cited

U.S. PATENT DOCUMENTS

| | | | |
|---|---|---|---|
| 5,625,550 A * | 4/1997 | Leggate | H02M 7/53875 318/811 |
| 2009/0179608 A1* | 7/2009 | Welchko | H02M 7/53875 318/801 |
| 2011/0221367 A1* | 9/2011 | Perisic | H02M 7/53871 318/400.02 |
| 2016/0285273 A1* | 9/2016 | Leinonen | H02J 3/1842 |

* cited by examiner

*Primary Examiner* — Bentsu Ro
*Assistant Examiner* — Zemenay Truneh
(74) *Attorney, Agent, or Firm* — Quinn IP Law (57) ABSTRACT

A method of controlling an alternating current (AC) motor includes following steps: (a) providing a voltage to the AC motor, wherein the voltage is a pulse-width modulation (PWM) signal, which is represented by a voltage reference vector; (b) determining that the voltage reference vector is in a distortion region; and (c) in response to determining that the voltage reference vector is in the distortion region, modifying, via a controller, the PWM signal by updating the voltage reference vector every half switching period to avoid the distortion region.

20 Claims, 5 Drawing Sheets

METHOD AND SYSTEM FOR PULSE WIDTH MODULATION

INTRODUCTION

The present disclosure generally relates to controlling alternating current (AC) motors, and more particularly, relates to apparatus and methods for pulse width modulation (PWM).

AC motors are used in a variety of applications, including vehicle applications such as traction control. The AC motors used in vehicle applications are typically controlled via a voltage source inverter. Pulse Width Modulation (PWM) methods are commonly employed in inverter controllers to control the fundamental output voltage component of three-phase voltage source inverters. These three-phase voltage source inverters may in turn be used to control the phase currents of three-phase AC motors.

Most PWM methods used with voltage source inverters are susceptible to voltage distortion due to practical limitations of the voltage source inverter, such as inverter lockout time, or dead time, and minimum pulse width constraints. These practical limitations are typically non-linear effects that manifest as finite and controllable minimum and maximum pulse widths. Either inverter switch, for a phase leg, of the voltage source inverter can be indefinitely held "ON" to create discrete values of pulse widths with duty cycles of zero and one, respectively. During some operating conditions, the commanded duty cycles for a particular phase leg have a pulse width between the minimum and maximum achievable pulse widths and the corresponding discrete values of zero and one. The non-linear effects produce unachievable regions (e.g., between the minimum and maximum achievable pulse widths and the corresponding discrete values of zero and one) that occur for each phase of the voltage source inverter. These unachievable regions are commonly known as "distortion regions."

Accordingly, it is desirable to provide a method that avoids these distortion regions, thereby minimizing inverter switching losses when operating a multi-phase AC motor. In addition, it is desirable to provide a voltage source inverter that avoids these distortion regions, thereby minimizing switching losses for controlling an AC motor. Furthermore, other desirable features and characteristics of the present disclosure will become apparent from the subsequent detailed description and the appended claims, taken in conjunction with the accompanying drawings and the foregoing technical field and background.

SUMMARY

The present disclosure describes a method of controlling an alternating current (AC) motor. In some embodiments, the method includes the following steps: (a) providing a voltage to the AC motor, wherein the voltage is a pulse-width modulation (PWM) signal represented by a voltage reference vector; (b) determining that the voltage reference vector is in a distortion region; and (c) in response to determining that the voltage reference vector is in the distortion region, modifying, via a controller, the PWM signal by updating the voltage reference vector every half switching period to avoid the distortion region. The method may further include determining a voltage sector based on the voltage reference vector. Further, the method may include determining a region within the determined voltage sector in which voltage reference vector is located. The method may further include determining that the voltage reference vector is in the first region, wherein the first region is not the distortion region, and in response to determining that the voltage reference vector is in the first region, the voltage reference vector is not compensated. The method may further include determining that the voltage reference vector is in a second region. The second region is the distortion region. In response to detecting that the voltage reference vector is in the second region, updating the voltage reference vector every half switching period controller such that a first compensated voltage reference vector is generated at the first half of a switching period, and a second compensated voltage reference vector at a second half of the switching period. The first compensated voltage reference vector is different from the second compensated voltage reference vector. A distance from the first compensated voltage reference vector to the voltage reference vector is equal to a distance from the second compensated voltage reference vector to the voltage reference vector. A value of the first compensated voltage reference vector is outside the distortion region. A value of the second compensated voltage reference vector is outside the distortion region.

The present disclosure also describes a voltage source inverter system. The voltage source inverter system includes a controller, an inverter circuit coupled to the controller, and an alternating current (AC) motor coupled to an output of the inverter circuit. The inverter circuit is configured to provide a voltage to the AC motor. The voltage is a pulse-width modulation (PWM) signal and is represented by a voltage reference vector. The controller is programmed: (a) determine that the voltage reference vector is in a distortion region; and (b) in response to determining that the voltage reference vector is in the distortion region, modify the PWM signal by updating the voltage reference vector every half switching period to avoid the distortion region. The controller may additionally be programmed to execute the methods described above.

The above features and advantages and other features and advantages of the present disclosure are readily apparent from the following detailed description of the best modes for carrying out the disclosure when taken in connection with the accompanying drawings.

DETAILED DESCRIPTION

Figure 1:
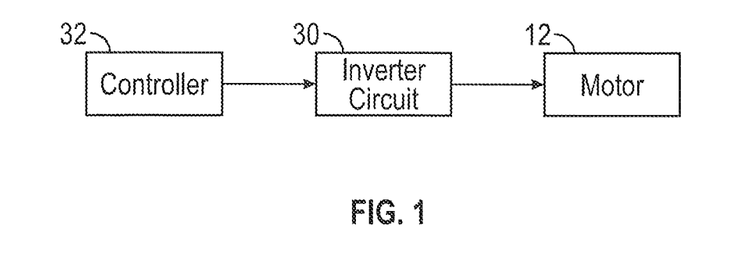
FIG. 1 is a block diagram of a voltage source inverter system in accordance with an exemplary embodiment of the present disclosure.

Referring to FIG. 1, a voltage source inverter (VSI) system 10 is shown in accordance with an exemplary embodiment of the present disclosure. The voltage source inverter system 10 includes a controller 32, an inverter circuit 30, and an alternating current (AC) motor 12 coupled to an output of the inverter circuit 30. The controller 32 may be coupled to the input and the output of the inverter circuit 30. Generally, the controller 32 produces a Pulse Width Modulation (PWM) signal for controlling the switching action of the inverter circuit 30. The controller 32 can produce a continuous PWM signal in order to cause each switch in a phase leg to turn on and off per carrier cycle. As a non-limiting example of a continuous PWM signal, the controller 32 may generate a space vector PWM (SVPWM) signal. The inverter circuit 30 then converts the PWM signal to a modulated voltage waveform for operating the AC motor 12. The AC motor 12 is a sinusoidally-wound AC motor (e.g., permanent magnet or induction), such as a traction drive control system.

The terms "controller," "control module," "control," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The controller 32 may alternatively be configured as a central processing unit (CPU). In order to appropriately control operation of the inverter circuit 30 and the AC motor 12, the controller 32 may include a processor (e.g., a microprocessor) and at least one memory, at least some of which is tangible and non-transitory. The memory can store controller executable instruction sets, and the processor can execute the controller executable instruction sets stored in the memory. The memory may be any recordable medium that participates in providing computer-readable data or process instructions. Such a medium may take many forms, including but not limited to non-volatile media and volatile media. Non-volatile media for the controller 32 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to the processor. The memory of the controller 32 may also include a floppy disk, a flexible disk, hard disk, magnetic tape, any other magnetic medium, a CD-ROM, DVD, any other optical medium, etc. The controller 32 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 32 or accessible thereby may be stored in the memory and automatically executed to provide the required functionality for the inverter circuit 30 and the AC motor 12.

To optimize the operation of the AC motor 12, the controller 32 monitors the modulated voltage waveform produced by the inverter circuit 30 and determines when the switching of the inverter circuit 30 is operating in a distortion region that is based on non-linear limitations (e.g., minimum pulse width and dead time) associated with the inverter circuit 30. When the inverter circuit 30 is operating in the distortion region, the controller 32 transmits a modified SVPWM signal that compensates for the distortion region. In other words, the controller 32 is specifically programmed to: (1) determine that the voltage reference vector is in the distortion region; and (2) in response to determining that the voltage reference vector is in the distortion region, modify the PWM signal by updating the voltage reference vector every half switching period to avoid the distortion region. In doing so, the controller 32 can effectively reduce the distortion region by fifty percent (in the average sense). As a consequence, voltage utilization in the voltage source inverter (VSI) system 10 is enhanced, and the torque generated by the AC motor 12 can be maximized.

Most SVPWM methods used with voltage source inverters are susceptible to voltage distortion due to practical limitations of the voltage source inverter, such as inverter lockout time, or dead time, and minimum pulse width constraints. These practical limitations are typically non-linear effects that manifest as finite and controllable minimum and maximum pulse widths. The non-linear effects produce unachievable regions that occur for each phase of the voltage source inverter. Accordingly, it is desirable to provide a method for minimizing inverter switching losses when operating a three phase AC motor. In addition, it is desirable to provide a voltage source inverter having minimized switching losses for controlling an AC motor.

Figure 2:
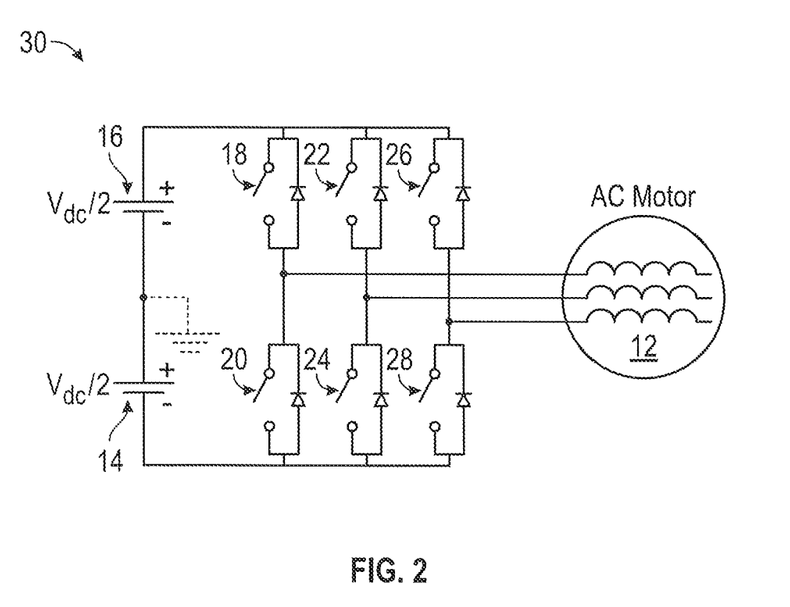
FIG. 2 is a schematic diagram of the inverter circuit shown in FIG. 1.

FIG. 2 is the inverter circuit 30 of FIG. 1 in greater detail. The inverter circuit 30 is a three-phase circuit coupled to the AC motor 12 and is fed with constant voltage. More specifically, the inverter circuit 30 includes DC voltage sources 14, 16 and a switch network having a first input coupled to the DC voltage sources 14, 16 and an output configured to couple to the AC motor 12. Although the voltages sources 14, 16 are shown as a distributed DC link with two series sources, a single voltage source may be used.

The switch network comprises three pairs of series switches with antiparallel diodes (i.e., antiparallel to each switch) corresponding to each of the phases. Each of the pairs of series switches comprises a first switch 18, 22, 26 having a first terminal coupled to a positive electrode of the DC voltage source 14, 16 and a second switch 20, 24, 28 having a second terminal coupled to a negative electrode of the voltage source 14, 16 and having a first terminal coupled to a second terminal of the first switch 18, 22, 26, respectively. To monitor the switching cycle and output voltage vector of the inverter circuit 30, the controller 32 is also coupled to the output of the inverter circuit 30.

Figure 3:
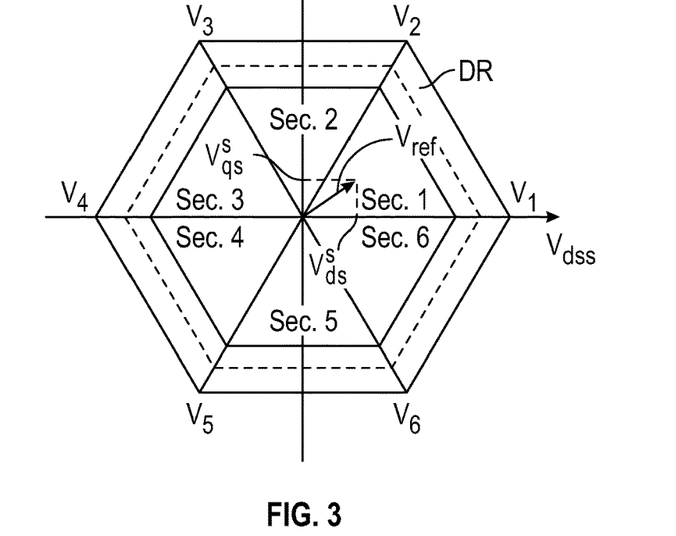
FIG. 3 is a graph of the inverter output voltage, showing distortion regions and being useful in understanding the voltage source inverter system shown in FIG. 1.

FIG. 3 is a voltage space vector reference frame or hexagon that models the inverter output voltages of the VSI system 10 and is useful in understanding the VSI system 10 shown in FIG. 1. This voltage space vector reference frame includes a direct axis (Vdss) and a quadrature axis (Vqss) in the stationary reference frame. The inverter output voltages are represented by vectors (e.g., V1, V2, V3, V4, V5, and V6) corresponding to the switching for each phase (e.g., each of three phases) of the switching cycle and have distortion regions DR (shown in cross-hatch). Each of the phases has two (2) states (e.g., corresponding to discrete one and zero). For example, V1 is the voltage vector corresponding to a discrete one state of the first pair of switches 18, 20 and a discrete zero state of each of the second and third pairs of switches 22, 24 and 26, 28; V2 is the voltage vector corresponding to a discrete one state of each of the first and second pairs of switches 18, 20 and 22, 24 and a discrete zero state of the third pairs of switches 26, 28; V3 is the voltage vector corresponding to a discrete zero state of each of the first and third pairs of switches 18, 20 and 26, 28 and a discrete one state of the second pair of switches 22, 24; V4 is the voltage vector corresponding to a discrete zero state of the first pair of switches 18, 20 and a discrete one state of each of the second and third pairs of switches 22, 24 and 26, 28; V5 is the voltage vector corresponding to a discrete zero state of each of the first and second pairs of switches 22, 24 and 26, 28 and a discrete one state of the third pair of switches; and V6 is the voltage vector corresponding to a discrete one state of each of the first and third pairs of switches 18, 20 and 26, 28 and a discrete zero state of the second pair of switches 22, 24. A zero vector (e.g., at the center of the reference frame) corresponds to either a discrete one state for each of the pairs of switches 18, 20, 22, 24, and 26, 28 or a discrete zero state for each of the pairs of switches 18, 20, 22, 24, and 26, 28.

Under all operating conditions, the switching network is subject to minimum pulse width limits and dead time limitations which are non-linear limitations represented by the distortion regions. SVPWM signals have distortion regions DR at a maximum modulation index based on the DC voltage supplied by the voltage sources 14, 16, which is predetermined based on the hardware of the VSI system 10.

In the voltage space vector reference frame shown in FIG. 3, the voltage reference vector Vref represents an exemplary output voltage of the inverter circuit 30. The space vector reference frame or hexagon is divided in equally sized sectors, namely: the first sector (Sec. 1); the second sector (Sec. 2); the third sector (Sec. 3); the fourth vector (Sec. 4); the fifth vector (Sec. 5); and the sixth vector (Sec. 6).

Figure 4:
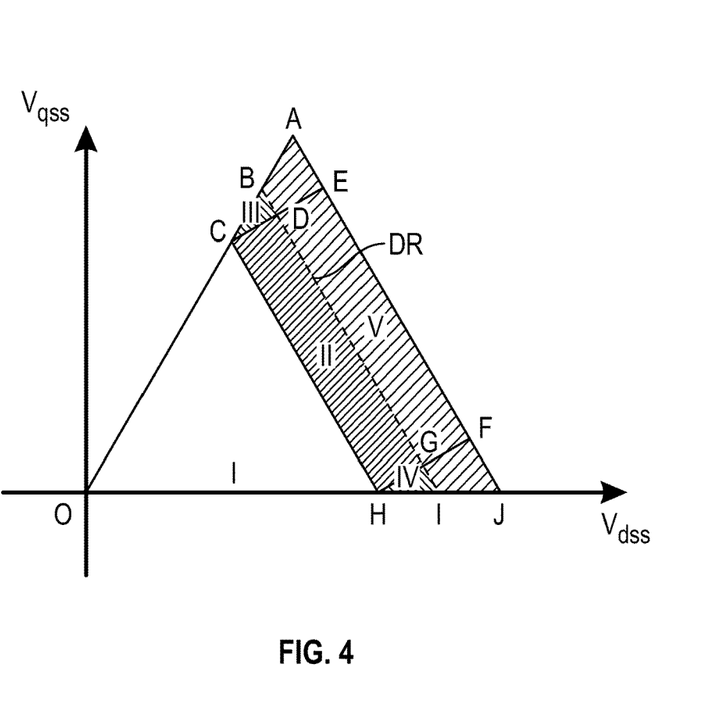
FIG. 4 is a graph of sector 1 of a voltage space vector reference frame shown in FIG. 3, showing different regions.

With reference to FIG. 4, each section of the voltage space vector reference frame is divided into five regions. Although FIG. 4 shows the first sector (Sec. 1), the entirety of all of the sections are divided into a first region (Region I), a second region (Region II), a third region (Region III), a fourth region (Region IV), and a fifth region (Region V). Region I is not a distortion region DR, whereas Region II, Region, III, Region IV, and Region V are all distortion regions DR (FIG. 3). Region I is delimited to the area defined by the nodes O, C, and H. Region II is delimited to the area defined by the nodes C, D, H, and G. Region III is delimited to the area defined by the nodes A, C, and E. Region IV is delimited to the area defined by the nodes H, F, and J. Region V is delimited by the area defined by nodes D, E, G, and F.

Figure 5:
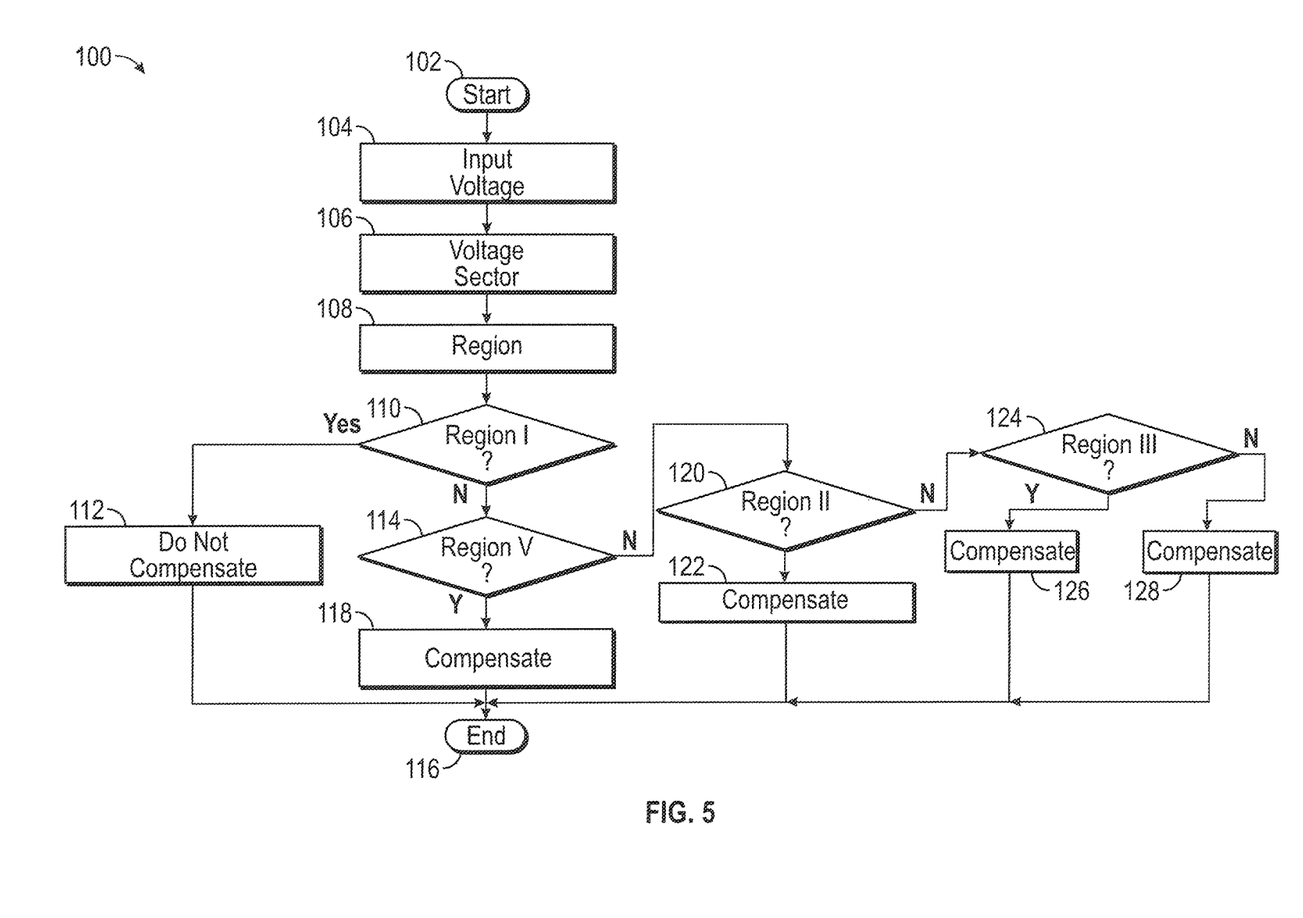
FIG. 5 is a flowchart of a method for controlling an AC motor.
Figure 6:
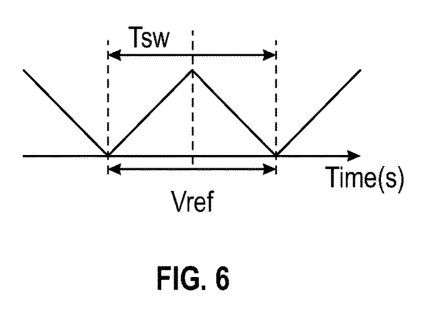
FIG. 6 is a graph showing a PWM scheme.
Figure 7:
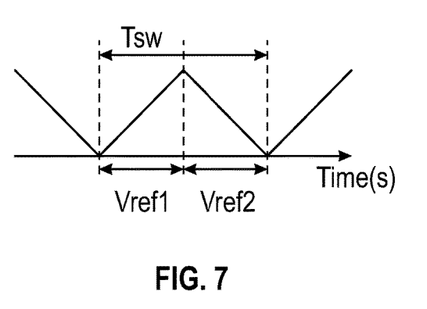
FIG. 7 is a graph showing a PWM scheme in accordance with another aspect of the present disclosure.

FIG. 5 is a flowchart of a method 100 for controlling an AC motor in accordance with an aspect of the present disclosure. The method 100 may be computer-readable data or process instructions stored on the memory of the controller 32, and the controller 32 is specially programmed to execute the instructions of the method 100. In the method 100, the voltage reference vector Vref is updated every half switching period Tsw solely when the voltage reference vector Vref is in the distortion region DR, as shown in FIG. 7. In FIG. 7, the triangular waveform is a counter or a carrier, Tsw represent the switching period, Vref1 represents a first compensated voltage reference vector, and Vref2 represents a second compensated voltage reference. In the method 100, the voltage reference vector Vref is updated to the first compensated voltage reference vector Vref1 at the first half of the switching period Tsw, and the second voltage reference vector Vref2 at a second half of the switching period Tsw to avoid distortion regions DR (FIG. 3) as shown in FIG. 7 instead of employing the same voltage reference vector Vref during the entire switching period Tsw as shown in FIG. 6. Therefore, by executing the method 100, the controller 32 can (a) determine that the voltage reference vector Vref is in a distortion region DR; and (b) in response to determining that the voltage reference vector Vref is in the distortion region DR, modify the PWM signal by updating the voltage reference vector Vref every half switching period to avoid the distortion region DR.

The method 100 begins at step 102. Step 102 merely represents a starting point of the method 100. After step 102, the method 100 proceeds to step 104. At step 104, the voltage sources 14, 16 provide DC voltage to the switch network of the inverter circuit 30, which in turn produce a modulated voltage waveform. Also at step 104, the controller 32 monitors the modulated voltage waveform produced by the inverter circuit 30 and determines the voltage reference vector Vref based on the monitored voltage waveform produced by the inverter circuit 30. Therefore, the controller 32 is programmed to monitor the modulated voltage waveform produced by the inverter circuit 30 and determine the voltage reference vector Vref based on the monitored voltage waveform.

Next, the method proceeds to step 106. At step 106, the controller 32 determines the voltage sector based on the determined voltage reference vector Vref. In other words, at step 106, the controller 32 is specifically programmed to determine whether the voltage reference vector Vref is located in the first sector (Sec. 1), the second sector (Sec. 2), the third sector (Sec. 3), the fourth vector (Sec. 4), the fifth vector (Sec. 5); or the sixth vector (Sec. 6). To do so, the controller 32 first identifies the direct axis component $V_{ds}^s$ and the quadrature axis component $V_{qs}^s$ of the voltage reference vector Vref in the voltage space vector reference frame. Then, the controller 32 determines (e.g., calculates) the sector angle using equation (1).

$$\alpha = \tan^{-1} \frac{V_{qs}^s}{V_{ds}^s} \tag{1}$$

wherein:
α is a sector angle in, for example, radians;
$V_{ds}^s$ is the direct axis component of the voltage reference vector Vref; and
$V_{qs}^s$ is the quadrature axis component of the voltage reference vector Vref.

After determining the sector angle α, the controller 32 determines that the voltage reference vector is in the first sector (Sec. 1) if and only if the sector angle α is greater than or equal to zero (0) and is less than $$\frac{\pi}{3}$$

by using equation (2):

$$0 \leq \alpha < \frac{\pi}{3} \tag{2}$$

wherein:

α is a sector angle in, for example, radians.

Otherwise, the controller 32 determines that the voltage reference vector Vref is in the second sector (Sec. 2) if and only if the sector angle α is greater than or equal to $$\frac{\pi}{3}$$

and less than $$\frac{2\pi}{3}$$

by using equation (3):

$$\frac{\pi}{3} \leq \alpha < \frac{2\pi}{3} \qquad (3)$$

wherein:

α is a sector angle in, for example, radians.

Otherwise, the controller 32 determines that the voltage reference vector Vref is in the third sector (Sec. 3) if and only if the sector angle α is greater than or equal to $$\frac{2\pi}{3}$$

and less than π by using equation (4):

$$\frac{2\pi}{3} \leq \alpha < \pi \qquad (4)$$

wherein:

α is a sector angle in, for example, radians.

Otherwise, the controller 32 determines that the voltage reference vector Vref is in the fourth sector (Sec. 4) if and only if the sector angle α is greater than or equal to π and less than $$\frac{4\pi}{3}$$

by using equation (5):

$$\pi \leq \alpha < \frac{4\pi}{3} \qquad (5)$$

wherein:

α is a sector angle in, for example, radians.

Otherwise, the controller 32 determines that the voltage reference vector Vref is in the fifth sector (Sec. 5) if and only if the sector angle α is greater than or equal to $$\frac{4\pi}{3}$$

and less than $$\frac{5\pi}{3}$$

by using equation (6):

$$\frac{4\pi}{3} \leq \alpha < \frac{5\pi}{3} \qquad (6)$$

wherein:

α is a sector angle in, for example, radians.

Otherwise, the controller 32 determines that the voltage reference vector Vref is in the sixth sector (Sec. 6), because the sector angle α is greater or equal to $$\frac{5\pi}{3}$$

and less than 2π. In summary, step 106 of the method 100 includes determining, using the controller 32, a voltage sector based on the voltage reference vector Vref. In other words, in step 106, the controller 32 determines in which voltage sector is the voltage reference vector Vref is located. Once the controller 32 has identified the sector in which the voltage reference vector Vref is located, the method 100 proceeds to step 108.

At step 108, the controller 32 determines the region within the voltage sector (determined in step 106) in which voltage reference vector Vref is located. To do so, the controller 32 first determines (e.g., calculates) a rotating transformation T(Θ), which is calculated using equation (7):

$$T(\Theta) = \begin{bmatrix} \cos(2-m)\frac{\pi}{3} & -\sin(2-m)\frac{\pi}{3} \\ \sin(2-m)\frac{\pi}{3} & \cos(2-m)\frac{\pi}{3} \end{bmatrix} \qquad (7)$$

wherein:

m is the number of the sector determined in step 106.

Figure 8:
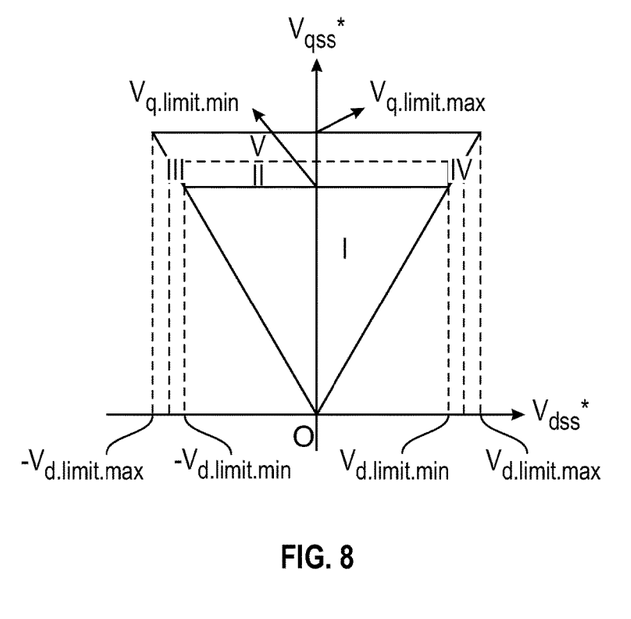
FIG. 8 is a graph showing a modified second sector used to determine the region in which the voltage reference vector is located.

Then, the controller 32 moves every original voltage reference vector Vref to a modified second sector in a modified voltage space vector reference frame (which includes a modified direct axis Vdss* and a modified quadrature axis Vqss*) as defined by the rotating transformation T(Θ) and as shown in FIG. 8. To do so, the controller 32 calculates a modified direct axis component $V_{ds}^{s*}$ and a modified quadrature axis component $V_{qs}^{s*}$ by using equation (8):

$$\begin{bmatrix} V_{ds}^{s*} \\ V_{qs}^{s*} \end{bmatrix} = T(\Theta) \begin{bmatrix} V_{ds}^{s} \\ V_{qs}^{s} \end{bmatrix} \qquad (8)$$

wherein:

T(Θ) is the rotating transformation;

$V_{ds}^{s}$ is the direct axis component of the voltage reference vector Vref; and $V_{qs}^{s}$ is the quadrature axis component of the voltage reference vector Vref.

The rotating transformation T(Θ) makes the calculation simple. Then, the controller 32 can use the modified direct axis component $V_{ds}^{s*}$ and the modified quadrature axis component $V_{qs}^{s*}$ to determine the region in which the voltage reference vector Vref is located. For example, the controller 32 can determine that the voltage reference vector Vref is in Region I if and only if the modified quadrature axis component $V_{qs}^{s*}$ is less than $V_{q.limit.min}$ by using equation (9):

$$V_{qs}^{s*} < V_{q.limit.min} \qquad (9)$$

wherein:

$V_{qs}^{s*}$ is the modified quadrature axis component; and $V_{q.limit.min}$ is the minimum limit of the distortion region in the modified quadrature axis Vqss* as shown in FIG. 7.

As discussed above, Region I is not a distortion region DR. The minimum limit $V_{q.limit.min}$ of the distortion region in the modified quadrature axis Vqss* is a predetermined value based on the hardware specification of the inverter circuit 30.

Otherwise, the controller 32 determines that the voltage reference vector Vref is in Region II if and only if the modified quadrature axis component $V_{qs}^{s*}$ is less than the average voltage limit $V_{q.limit.avg}$ in the modified quadrature axis Vqss*; the modified direct axis component $V_{ds}^{s*}$ is greater than the minimum negative voltage limit $-V_{d.limit.min}$ in the modified direct axis component $V_{ds}^{s*}$; and the modified direct axis component $V_{ds}^{s*}$ is less than the minimum positive voltage limit $V_{d.limit.min}$ in the modified direct axis component $V_{ds}^{s*}$. In doing so, the controller 32 can use equations (10), (11), and (12):

$$V_{qs}^{s*} < V_{q.limit.avg} \qquad (10)$$

$$-V_{d.limit.min} < V_{ds}^{s*} < V_{d.limit.min} \qquad (11)$$

$$V_{q.limit.avg} = \frac{V_{q.limit.min} + V_{q.limit.max}}{2} \qquad (12)$$

wherein:

$V_{qs}^{s*}$ is the modified quadrature axis component;

$V_{ds}^{s*}$ is the modified direct axis component;

$-V_{d.limit.min}$ is the minimum negative voltage limit of the distortion region in the modified direct axis Vdss* as shown in FIG. 7;

$V_{d.limit.min}$ is the minimum positive voltage limit of the distortion region in the modified direct axis Vdss* as shown in FIG. 7;

$V_{d.limit.max}$ is the maximum voltage limit of the distortion region in the modified direct axis Vdss* as shown in FIG. 7; and $V_{q.limit.avg}$ is the average voltage limit of the distortion region in the modified quadrature axis Vqss* as shown in FIG. 7.

The minimum negative voltage limit $-V_{d.limit.min}$ of the distortion region in the modified direct axis Vdss*, the minimum positive voltage limit $V_{d.limit.min}$ of the distortion region in the modified direct axis Vdss*, and the maximum voltage limit $V_{d.limit.max}$ of the distortion region in the modified direct axis Vdss* are predetermined values based on the hardware specification of the inverter circuit 30.

Otherwise, the controller 32 determines that the voltage reference vector Vref is in Region III if and only if the modified quadrature axis component $V_{qs}^{s*}$ is less than the average voltage limit $V_{q.limit.avg}$ in the modified quadrature axis Vqss*; the modified direct axis component $V_{ds}^{s*}$ is greater than the average negative voltage limit $-V_{d.limit.avg}$ in the modified direct axis Vdss*; and the modified direct axis component $V_{ds}^{s*}$ is less than the minimum negative voltage limit $-V_{d.limit.min}$ in the modified direct axis Vdss*. In doing so, the controller 32 can use equations (10), (13), and (14):

$$-V_{d.limit.avg} < V_{ds}^{s*} < -V_{d.limit.min} \qquad (13)$$

$$V_{d.limit.avg} = \frac{V_{d.limit.min} + V_{d.limit.max}}{2} \qquad (14)$$

wherein:

$V_{qs}^{s*}$ is the modified quadrature axis component;

$-V_{d.limit.min}$ is the minimum negative voltage limit of the distortion region in the modified direct axis Vdss* as shown in FIG. 7;

$V_{d.limit.min}$ is the minimum positive voltage limit of the distortion region in the modified direct axis Vdss* as shown in FIG. 7;

$V_{d.limit.max}$ is the maximum voltage limit of the distortion region in the modified direct axis Vdss* as shown in FIG. 7; and $V_{d.limit.avg}$ is the average voltage limit of the distortion region in the modified direct axis Vdss* as shown in FIG. 7.

Otherwise, the controller 32 determines that the voltage reference vector Vref is in Region IV if and only if the modified quadrature axis component $V_{qs}^{s*}$ is less than the average voltage limit $V_{q.limit.avg}$ in the modified quadrature axis Vqss*; the modified direct axis component $V_{ds}^{s*}$ is greater than the minimum positive voltage limit $V_{d.limit.min}$ in the modified direct axis Vdss*; and the modified direct axis component $V_{ds}^{s*}$ is less than the average voltage limit $V_{d.limit.min}$ in the modified direct axis Vdss*. In doing so, the controller 32 can use equations (10), (14), and (15):

$$V_{d.limit.min} < V_{ds}^{s*} < V_{d.limit.avg} \qquad (15)$$

wherein:

$V_{ds}^{s*}$ is the modified direct axis component;

$V_{d.limit.min}$ is the minimum positive voltage limit of the distortion region in the modified direct axis Vdss* as shown in FIG. 7; and $V_{d.limit.avg}$ is the average voltage limit of the distortion region in the modified direct axis Vdss* as shown in FIG. 7.

Otherwise, the controller 32 determines that the controller 32 determines that the voltage reference vector Vref is in Region V. After determining in which region the voltage reference vector Vref is located, the method 100 proceeds to step 110.

Step 110 is a decision block in which the controller 32 determines if the voltage reference vector Vref is in Region I. If the voltage reference vector Vref is in Region I, then the method 100 proceeds to step 112. At step 112, the voltage reference vector Vref is not compensated, and the controller 32 employs a conventional PWM scheme to control the AC motor 12. Thus, in response to determining that the voltage reference vector Vref is not in Region I, the controller 32 does not compensate the voltage reference vector Vref. After controlling the AC motor 12 at step 112, then the method 100 ends at step 116. If the voltage reference vector Vref is not in Region I, then the method 100 proceeds to step 114.

Step 114 is a decision block in which the controller 32 determines if the voltage reference vector Vref is located in Region V. If the voltage reference vector Vref is located in Region V, then the method 100 proceeds to step 118. At step 118, the controller 32 compensates the voltage reference vector Vref in order avoid the distortion region DR using a conventional PWM compensation scheme. After the controller 32 executes step 114, the method 100 ends at step 116. If the voltage reference vector Vref is not located in Region V, then the method 100 continues to step 120.

Figure 9:
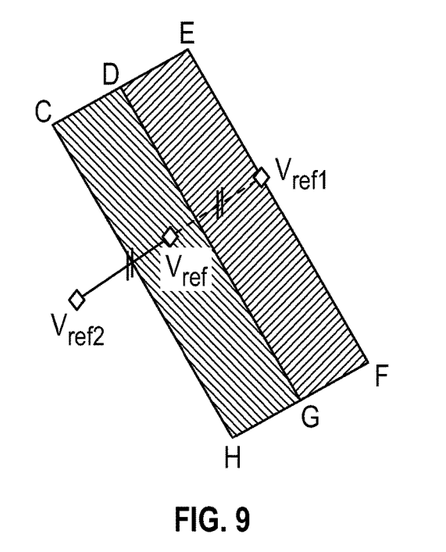
FIG. 9 is a graph representing a voltage compensation when the voltage reference vector is at Region II.

Step 120 is a decision block in which the controller 32 determines if the voltage reference vector Vref is in Region II. If the voltage reference vector Vref is in Region II, then the method 100 proceeds to step 122. At step 122, the controller 32 compensates the voltage reference vector Vref in order to avoid the distortion region DR. At Region II, the first compensated voltage reference vector Vref1 is generated during a half of the switching period Tsw, and the second compensated voltage reference vector Vref2 is generated at another half of the switching period Tsw. As shown in FIG. 9, the slope between first compensated voltage reference vector Vref1 and second compensated voltage reference vector Vref2 is perpendicular to a straight line extending from node E to node F. In other words, the controller 32 updates the voltage reference vector Vref to the first compensated voltage reference vector Vref1 at the first half of the switching period Tsw, and the second voltage reference vector Vref2 at a second half of the switching period Tsw to avoid distortion regions DR (FIG. 3). The first compensated voltage reference vector Vref1 is different from the second compensated voltage reference vector Vref2 in order to avoid the avoid distortion regions DR (FIG. 3). In doing so, the controller 32 employs equations (16) and (17):

$$V_{ref1\_mod} = \left(V_{ds}^{s*}, \frac{V_{dc}}{\sqrt{3}}\right) \quad (16)$$

$$V_{ref2\_mod} = \left(V_{ds}^{s*}, 2V_{qs}^{s*} - \frac{V_{dc}}{\sqrt{3}}\right) \quad (17)$$

wherein:
$V_{ds}^{s*}$ is the modified direct axis component;
$V_{qs}^{s*}$ is the modified quadrature axis component;
$V_{dc}$ the DC-link voltage of the inverter circuit 30;
$V_{ref1\_mod}$ is the modified first compensated voltage reference vector Vref1, which is rotated by the rotating transformation T(Θ); and
$V_{ref2\_mod}$ is the modified first compensated voltage reference vector Vref2, which is rotated by the rotating transformation T(Θ).

Alternatively, the controller 32 updates the voltage reference vector Vref to the second compensated voltage reference vector Vref2 at the first half of the switching period Tsw, and the first compensated voltage reference vector Vref1 at a second half of the switching period Tsw to avoid distortion regions DR (FIG. 3). In doing so, the controller 32 employs equation (19):

$$V_{ref1\_mod} = \left(V_{ds}^{s*}, 2V_{qs}^{s*} - \frac{V_{dc}}{\sqrt{3}}\right) \quad (19)$$

wherein:
$V_{ds}^{s*}$ is the modified direct axis component;
$V_{qs}^{s*}$ is the modified quadrature axis component;
$V_{dc}$ the DC-link voltage of the inverter circuit 30;
$V_{ref1\_mod}$ is the first modified compensated voltage reference vector Vref1, which is rotated by the rotating transformation T(Θ).

As discussed above, the first modified compensated voltage reference vector Vref1_mod and the second modified compensated voltage reference vector Vref2_mod are rotated by the rotating transformation T(Θ), and should be re-rotated to the original domain using equations (20) and (21):

$$T^{-1}(\Theta) = \begin{bmatrix} \cos(2-m)\frac{\pi}{3} & \sin(2-m)\frac{\pi}{3} \\ -\sin(2-m)\frac{\pi}{3} & \cos(2-m)\frac{\pi}{3} \end{bmatrix} \quad (20)$$

$$V_{ref} = \begin{bmatrix} V_{ds}^{s} \\ V_{qs}^{s} \end{bmatrix} = T^{-1}(\Theta)\begin{bmatrix} V_{ds}^{s*} \\ V_{qs}^{s*} \end{bmatrix} = T^{-1}(\Theta)V_{ref\_mod} \quad (21)$$

wherein:
m is the number of the sector determined in step 106;
$V_{ds}^{s*}$ is the modified direct axis component;
$V_{qs}^{s*}$ is the modified quadrature axis component; and
$V_{ref\_mod}$ is either the first or second modified compensated voltage reference vector Vref1, which is rotated by the rotating transformation T(Θ).

After controlling the AC motor 12 at step 122, then the method 100 ends at step 116. If the voltage reference vector Vref is not in Region II, then the method 100 proceeds to step 124.

Figure 10:
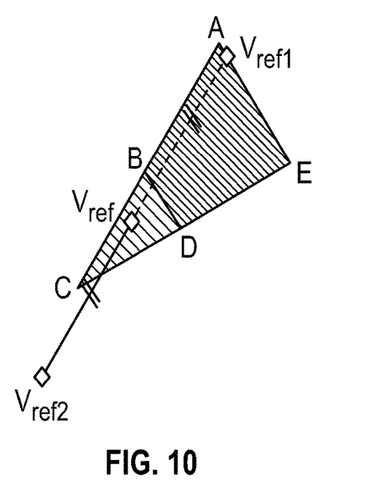
FIG. 10 is a graph representing a voltage compensation when the voltage reference vector is at Region III.
Figure 11:
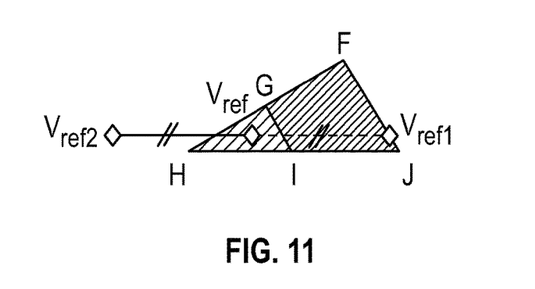
FIG. 11 is a graph representing a voltage compensation when the voltage reference vector is at Region IV.

Step 124 is a decision block in which the controller 32 determines if the voltage reference vector Vref is in Region III. If the voltage reference vector Vref is in Region III, then the method 100 proceeds to step 126. At step 126, the controller 32 compensates the voltage reference vector Vref in order to avoid the distortion region DR. At Region III, the first compensated voltage reference vector Vref1 is generated during a half of the switching period Tsw, and the second compensated voltage reference vector Vref2 is generated at another half of the switching period Tsw. As shown in FIG. 10, at region III, the slope between the first compensated voltage reference vector Vref1 and the second compensated voltage reference vector Vref2 is parallel to a straight line extending from the node A to the node C. In doing so, the controller 32 updates the voltage reference vector Vref to the first compensated voltage reference vector Vref1 at the first half of the switching period Tsw, and the second voltage reference vector Vref2 at a second half of the switching period Tsw to avoid distortion regions DR (FIG. 3). The first compensated voltage reference vector Vref1 is different from the second compensated voltage reference vector Vref2 in order to avoid distortion regions DR (FIG. 3). In FIG. 11, the first compensated voltage reference vector Vref1 on the straight line extending from the node A to node J, and the distance from the first compensated voltage reference vector Vref1 to the voltage reference vector Vref is equal to the distance from the second compensated voltage reference vector Vref2 to the voltage reference vector Vref to generate the Vref on the average sense. The value of the first compensated voltage reference vector Vref1 is outside the distortion region DR, and the value of the second compensated voltage reference vector Vref2 is outside the distortion region DR. At step 126, the controller 32 employs equations (22) and (23):

$$V_{ref1\_mod} = \left(V_{ds}^{s*} + \frac{1}{\sqrt{3}}\left(V_{qs}^{s*} - \frac{V_{dc}}{\sqrt{3}}\right), \frac{V_{dc}}{\sqrt{3}}\right) \quad (22)$$

-continued $$V_{ref2\_mod} = \left(V_{ds}^{s*} - \frac{1}{\sqrt{3}}\left(V_{qs}^{s*} - \frac{V_{dc}}{\sqrt{3}}\right), 2V_{qs}^{s*} - \frac{V_{dc}}{\sqrt{3}}\right) \quad (24)$$

wherein:
$V_{ds}^{s*}$ is the modified direct axis component;
$V_{qs}^{s*}$ is the modified quadrature axis component;
$V_{dc}$ the DC-link voltage of the inverter circuit 30;
$V_{ref1\_mod}$ is the first modified compensated voltage reference vector Vref1, which is rotated by the rotating transformation T(Θ); and
$V_{ref2\_mod}$ is the second modified compensated voltage reference vector Vref1, which is rotated by the rotating transformation T(Θ).

Alternatively, the controller 32 updates the voltage reference vector Vref to the second compensated voltage reference vector Vref2 at the first half of the switching period Tsw, and the first compensated voltage reference vector Vref1 at a second half of the switching period Tsw to avoid distortion regions DR (FIG. 3). In doing so, the controller 32 employs equations (24) and (25):

$$V_{ref2\_mod} = \left(V_{ds}^{s*} + \frac{1}{\sqrt{3}}\left(V_{qs}^{s*} - \frac{V_{dc}}{\sqrt{3}}\right), \frac{V_{dc}}{\sqrt{3}}\right) \quad (24)$$

$$V_{ref1\_mod} = \left(V_{ds}^{s*} - \frac{1}{\sqrt{3}}\left(V_{qs}^{s*} - \frac{V_{dc}}{\sqrt{3}}\right), 2V_{qs}^{s*} - \frac{V_{dc}}{\sqrt{3}}\right) \quad (25)$$

wherein:
$V_{ds}^{s*}$ is the modified direct axis component;
$V_{qs}^{s*}$ is the modified quadrature axis component;
$V_{dc}$ the DC-link voltage of the inverter circuit 30;
$V_{ref1\_mod}$ is the first modified compensated voltage reference vector Vref1, which is rotated by the rotating transformation T(Θ); and
$V_{ref2\_mod}$ is the second modified compensated voltage reference vector Vref1, which is rotated by the rotating transformation T(Θ).

As discussed above, the first modified compensated voltage reference vector Vref1_mod and the second modified compensated voltage reference vector Vref2_mod are rotated by the rotating transformation T(Θ), and should be re-rotated to the original domain using equations (20) and (21).

After controlling the AC motor 12 at step 126, then the method 100 ends at step 116. If the voltage reference vector Vref is not in Region III, then the method 100 proceeds to step 128.

At step 128, the controller 32 compensates the voltage reference vector Vref in order to avoid the distortion region DR. At Region IV, the first compensated voltage reference vector Vref1 is generated during a half of the switching period Tsw, and the second compensated voltage reference vector Vref2 is generated at another half of the switching period Tsw. As shown in FIG. 11, at region IV, the slope between the first compensated voltage reference vector Vref1 and the second compensated voltage reference vector Vref2 is parallel to a straight line extending from the node H to the node I. In doing so, the controller 32 updates the voltage reference vector Vref to the first compensated voltage reference vector Vref1 at the first half of the switching period Tsw, and the second voltage reference vector Vref2 at a second half of the switching period Tsw to avoid distortion regions DR (FIG. 3). The first compensated voltage reference vector Vref1 is different from the second compensated voltage reference vector Vref2 in order to avoid the avoid distortion regions DR (FIG. 3). In FIG. 11, the first compensated voltage reference vector Vref1 on the straight line extending from the node H to node J, and the distance from the first compensated voltage reference vector Vref1 to the voltage reference vector Vref is the same as the distance from the second compensated voltage reference vector Vref2 to the voltage reference vector Vref to generate the Vref on the average sense. At step 128, the controller 32 employs equations (26) and (27):

$$V_{ref1\_mod} = \left(V_{ds}^{s*} - \frac{1}{\sqrt{3}}\left(V_{qs}^{s*} - \frac{V_{dc}}{\sqrt{3}}\right), \frac{V_{dc}}{\sqrt{3}}\right) \quad (26)$$

$$V_{ref2\_mod} = \left(V_{ds}^{s*} + \frac{1}{\sqrt{3}}\left(V_{qs}^{s*} - \frac{V_{dc}}{\sqrt{3}}\right), 2V_{qs}^{s*} - \frac{V_{dc}}{\sqrt{3}}\right) \quad (27)$$

wherein:
$V_{ds}^{s*}$ is the modified direct axis component;
$V_{qs}^{s*}$ is the modified quadrature axis component;
$V_{dc}$ the DC-link voltage of the inverter circuit 30;
$V_{ref1\_mod}$ is the first modified compensated voltage reference vector Vref1, which is rotated by the rotating transformation T(Θ); and
$V_{ref2\_mod}$ is the second modified compensated voltage reference vector Vref1, which is rotated by the rotating transformation T(Θ).

Alternatively, the controller 32 updates the voltage reference vector Vref to the second compensated voltage reference vector Vref2 at the first half of the switching period Tsw, and the first compensated voltage reference vector Vref1 at a second half of the switching period Tsw to avoid distortion regions DR (FIG. 3). In doing so, the controller 32 employs equations (28) and (29):

$$V_{ref2\_mod} = \left(V_{ds}^{s*} - \frac{1}{\sqrt{3}}\left(V_{qs}^{s*} - \frac{V_{dc}}{\sqrt{3}}\right), \frac{V_{dc}}{\sqrt{3}}\right) \quad (28)$$

$$V_{ref1\_mod} = \left(V_{ds}^{s*} + \frac{1}{\sqrt{3}}\left(V_{qs}^{s*} - \frac{V_{dc}}{\sqrt{3}}\right), 2V_{qs}^{s*} - \frac{V_{dc}}{\sqrt{3}}\right) \quad (29)$$

As discussed above, the first modified compensated voltage reference vector Vref1_mod and the second modified compensated voltage reference vector Vref2_mod are rotated by the rotating transformation T(Θ), and should be re-rotated to the original domain using equations (20) and (21). After controlling the AC motor 12 at step 128 by modifying the PWM signal, then the method 100 ends at step 116.

While the best modes for carrying out the disclosure have been described in detail, those familiar with the art to which this disclosure relates will recognize various alternative designs and embodiments for practicing the disclosure within the scope of the appended claims.

What is claimed is:

1. A method of controlling an alternating current (AC) three-phase motor, comprising:
providing a voltage to the AC three-phase motor, wherein the voltage is a space vector pulse-width modulation (SVPWM) signal which is represented by a voltage reference vector; and
determining that the voltage reference vector is in a distortion region;

in response to determining that the voltage reference vector is in the distortion region, modifying, via a controller, the SVPWM signal by updating the voltage reference vector every half switching period to avoid the distortion region.

2. The method of claim 1, further comprising determining a voltage sector based on the voltage reference vector.

3. The method of claim 2, further comprising determining a region within the voltage sector in which voltage reference vector is located.

4. The method of claim 3, further comprising determining that the voltage reference vector is in a first region, wherein the first region is not the distortion region, and in response to determining that the voltage reference vector is in the first region, the voltage reference vector is not compensated.

5. The method of claim 3, further comprising determining that the voltage reference vector is in a second region, wherein the second region is the distortion region, and in response to detecting that the voltage reference vector is in the second region, updating the voltage reference vector every half switching period controller such that a first compensated voltage reference vector is generated at a first half of a switching period, and a second compensated voltage reference vector at a second half of the switching period.

6. The method of claim 5, wherein the first compensated voltage reference vector is different from the second compensated voltage reference vector.

7. The method of claim 6, wherein a distance from the first compensated voltage reference vector to the voltage reference vector is equal to a distance from the second compensated voltage reference vector to the voltage reference vector.

8. The method of claim 7, wherein a value of the first compensated voltage reference vector is outside the distortion region.

9. The method of claim 8, wherein a value of the second compensated voltage reference vector is outside the distortion region.

10. A voltage source inverter system, comprising:
a controller;
an inverter circuit coupled to the controller, wherein the inverter circuit is a three-phase circuit; and
an alternating current (AC) three-phase motor coupled to an output of the inverter circuit;
wherein the inverter circuit is configured to provide a voltage to the AC motor, and the voltage is a space vector pulse-width modulation (SVPWM) signal which is represented by a voltage reference vector; and
wherein the controller is programmed:
determine that the voltage reference vector is in a distortion region, wherein the controller is programmed to determine that the voltage reference vector is in the distortion region by:
determining a voltage sector based on the voltage reference vector;
identifying a direct axis component and a quadrature axis component of the voltage reference vector in a voltage space vector reference frame;
calculating a sector angle using a first equation, wherein the first equation is:

$$\alpha = \tan^{-1}\frac{V_{qs}^s}{V_{ds}^s}$$

wherein $\alpha$ is the sector angle, $V_{ds}^s$ is the direct axis component of the voltage reference vector; and $V_{qs}^s$ is the quadrature axis component of the voltage reference vector; and
in response to determining that the voltage reference vector is in the distortion region, modify the SVPWM signal by updating the voltage reference vector every half of a switching period to avoid the distortion region.

11. The voltage source inverter system of claim 10, wherein the controller is programmed to determine a voltage sector based on the voltage reference vector.

12. The voltage source inverter system of claim 11, wherein the controller is programmed to determine a region within the voltage sector in which voltage reference vector is located.

13. The voltage source inverter system of claim 12, wherein the controller is programmed to determine that the voltage reference vector is in first region, wherein the first region is not the distortion region, and in response to determining that the voltage reference vector is in the first region, the voltage reference vector is not compensated.

14. The voltage source inverter system of claim 11, wherein the controller is programmed to determine that the voltage reference vector is in a second region, wherein the second region is the distortion region, and in response to detecting that the voltage reference vector is in the second region, updating the voltage reference vector every half switching period controller such that a first compensated voltage reference vector is generated at a first half of a switching period, and a second compensated voltage reference vector at a second half of the switching period.

15. The voltage source inverter system of claim 14, wherein the first compensated voltage reference vector is different from the second compensated voltage reference vector.

16. The voltage source inverter system of claim 15, wherein a distance from the first compensated voltage reference vector to the voltage reference vector is equal to a distance from the second compensated voltage reference vector to the voltage reference vector.

17. The voltage source inverter system of claim 16, wherein a value of the first compensated voltage reference vector is outside the distortion region.

18. The voltage source inverter system of claim 17, wherein a value of the second compensated voltage reference vector is outside the distortion region.

19. The voltage source inverter system of claim 10, wherein the controller determines that the voltage reference vector is in the distortion region by:
determining that the voltage reference vector is in a first sector if and only if the sector angle is greater than or equal to zero and is less than $$\frac{\pi}{3};$$

determining a rotating transformation, the rotating transformation is calculated using a second equation, wherein the second equation is:

$$T(\Theta) = \begin{bmatrix} \cos(2-m)\frac{\pi}{3} & -\sin(2-m)\frac{\pi}{3} \\ \sin(2-m)\frac{\pi}{3} & \cos(2-m)\frac{\pi}{3} \end{bmatrix}$$

wherein T(Θ) is the rotating transformation, and m is a number of the sector in which the voltage reference vector is located, the voltage sector is the first sector, and m is one;

moving the voltage reference vector, using the rotating transformation, to a modified vector in a modified voltage space vector reference frame, the modified voltage space vector reference frame including a modified direct axis and a modified quadrature axis, wherein moving the voltage reference vector includes:

calculating a modified direct axis component and a modified quadrature axis component by using a third equation, wherein the third equation is:

$$\begin{bmatrix} V_{ds}^{s*} \\ V_{qs}^{s*} \end{bmatrix} = T(\Theta) \begin{bmatrix} V_{ds}^{s} \\ V_{qs}^{s} \end{bmatrix}$$

wherein $V_{ds}^{s*}$ is the modified direct axis component, and $V_{qs}^{s*}$ is the modified quadrature axis component; and determining that the voltage reference vector is in a second region if and only if the modified quadrature axis component is less than an average voltage limit of the distortion region in the modified quadrature axis, the modified direct axis component is greater than a minimum negative voltage limit of the distortion region in the modified direct axis component, and the modified direct axis component is less than a minimum positive voltage limit of the distortion region in the modified direct axis component.

20. The voltage source inverter system of claim 19, the controller is programmed to compensate the voltage reference vector in response to determining that the voltage reference vector is in the second region in order to avoid the distortion region by:

generating a first compensated voltage reference vector at a first half of the switching period, and generating a second compensated voltage reference vector at a second half of the switching period by calculating a first modified compensated voltage reference vector and a second modified compensated voltage reference vector using a fourth equation and a fifth equation, wherein the fourth equation is:

$$V_{ref1\_mod} = \left( V_{ds}^{s*} + \frac{1}{\sqrt{3}} \left( V_{qs}^{s*} - \frac{V_{dc}}{\sqrt{3}} \right), \frac{V_{dc}}{\sqrt{3}} \right)$$

wherein the fifth equation is:

$$V_{ref2\_mod} = \left( V_{ds}^{s*} - \frac{1}{\sqrt{3}} \left( V_{qs}^{s*} - \frac{V_{dc}}{\sqrt{3}} \right), 2V_{qs}^{s*} - \frac{V_{dc}}{\sqrt{3}} \right)$$

wherein:

$V_{ds}^{s*}$ is a modified direct axis component;

$V_{qs}^{s*}$ is a modified quadrature axis component;

$V_{dc}$ a DC-link voltage of the inverter circuit;

$V_{ref1\_mod}$ is the first modified compensated voltage reference vector that is rotated by the rotating transformation; and $V_{ref2\_mod}$ is the second modified compensated voltage reference vector that is rotated by the rotating transformation;

re-rotating the first modified compensated voltage reference vector and the second modified compensated voltage reference vector using a sixth equation and a seventh equation;

wherein the sixth equation is:

$$T^{-1}(\Theta) = \begin{bmatrix} \cos(2-m)\frac{\pi}{3} & \sin(2-m)\frac{\pi}{3} \\ -\sin(2-m)\frac{\pi}{3} & \cos(2-m)\frac{\pi}{3} \end{bmatrix}$$

wherein the seventh equation is:

$$V_{ref} = \begin{bmatrix} V_{ds}^{s} \\ V_{qs}^{s} \end{bmatrix} = T^{-1}(\Theta) \begin{bmatrix} V_{ds}^{s*} \\ V_{qs}^{s*} \end{bmatrix}$$

wherein:

m is the number of the voltage sector determined, and m is one;

$V_{ds}^{s*}$ is the modified direct axis component;

$V_{qs}^{s*}$ is the modified quadrature axis component;

$T^{-1}(\Theta)$ in a matrix inverse of the rotating transformation;

$V_{ds}^{s}$ is the direct axis component of the voltage reference vector;

$V_{qs}^{s}$ is the quadrature axis component of the voltage reference vector; and $V_{ref}$ is the voltage reference vector.

* * * * *